April 17, 1956  R. S. BERGEN ET AL  2,742,634
SUPERVISORY CIRCUIT FOR AMBIENT CONDITION DETECTOR
Filed July 21, 1953  2 Sheets-Sheet 1
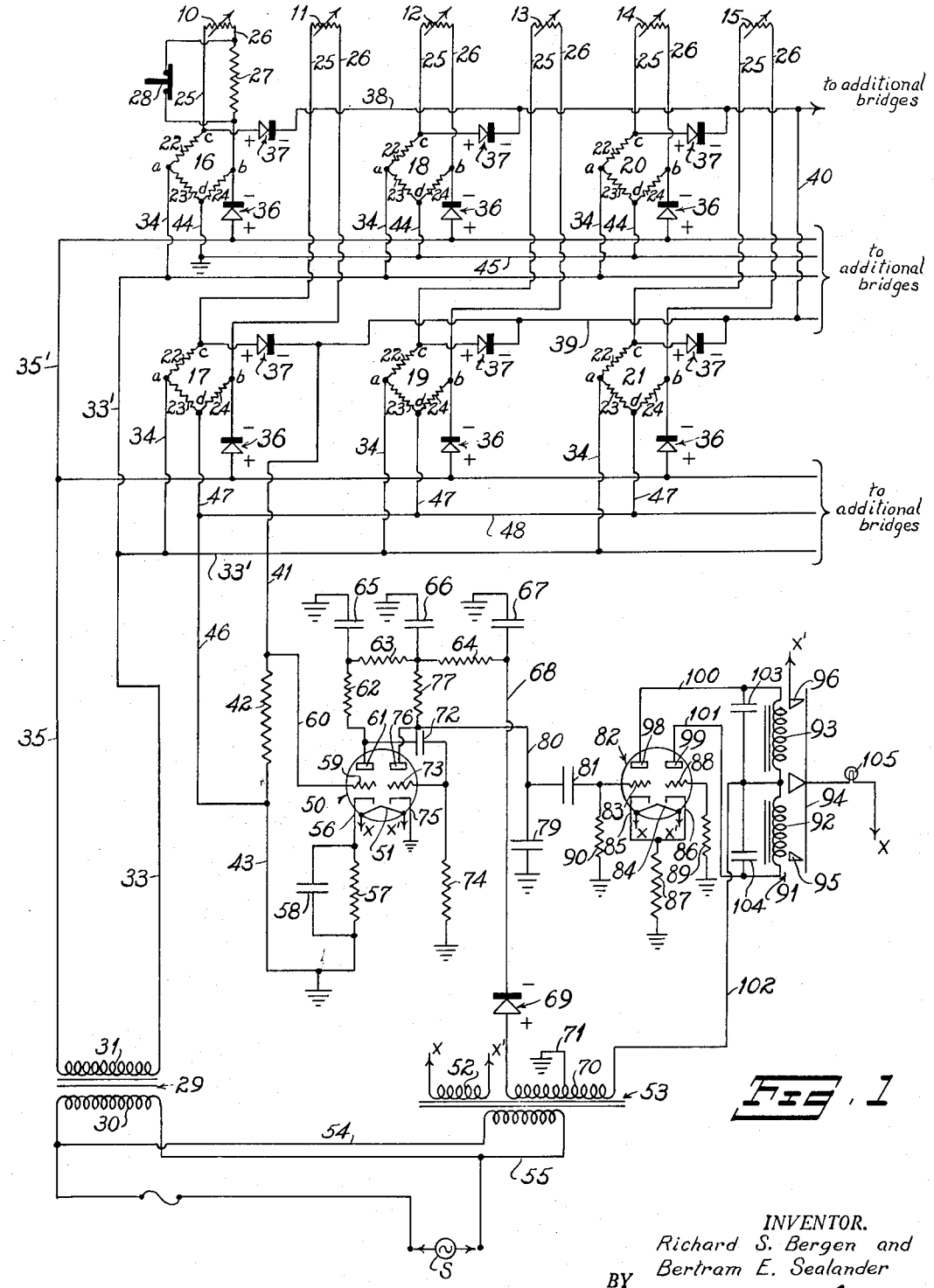
INVENTOR.
Richard S. Bergen and
Bertram E. Sealander
BY
Charles S. Wilson
ATTORNEY.

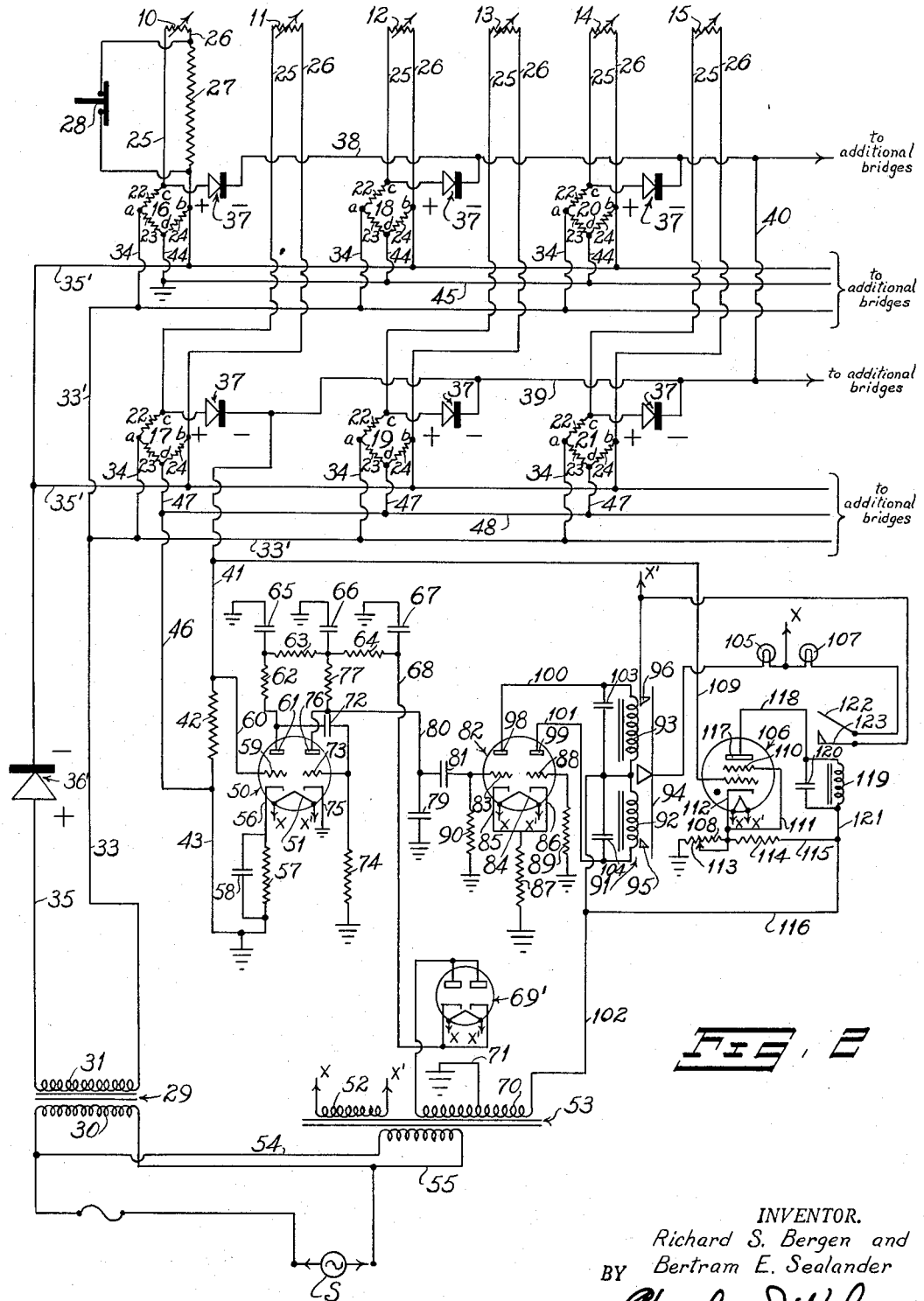

United States Patent Office 2,742,634
Patented Apr. 17, 1956

2,742,634

SUPERVISORY CIRCUIT FOR AMBIENT CONDITION DETECTOR

Richard S. Bergen, North Merrick, and Bertram E. Sealander, New Hyde Park, N. Y., assignors to Republic Aviation Corporation, Farmingdale, N. Y., a corporation of Delaware Application July 21, 1953, Serial No. 369,354

18 Claims. (Cl. 340—213)

The present invention relates in general to signaling systems and more particularly to a system for indicating at a central station variations in predetermined conditions at a plurality of outlying or remote individual and independent stations.

The signalling system contemplated by the instant invention is generally useful for measuring physical conditions at an individual to each of a plurality of outlying stations, and to provide a signal at a central station whenever one or more of the measured conditions varies from a given critical or predetermined value or whenever one or more of the outlying stations becomes inoperative to measure the ambient, physical conditions.

To the above ends, the present invention contemplates, in general, a system including a plurality of outlying or remotely positioned detector stations each including a Wheatstone bridge having one leg thereof formed by a resistor, the resistance of which varies in response to an ambient condition. The input circuit to each bridge includes a source of alternating current that is rectified by a half wave rectifier to the end that a pulsing or interrupted direct current is fed to the input terminals of the bridge. Each bridge is so constructed and arranged that when the resistance of the sensing or detecting element varies from a predetermined value in response to a predetermined change in the ambient condition being sensed, the bridge becomes unbalanced and transmits a signal. Since the current supplied to each bridge is rectified, the bridge current or signal produced by an unbalancing in one direction from a critical value or point is opposite in phase, or 180° out of phase, with the bridge current or signal, produced by an unbalancing in the opposite direction. Moreover, the negative phase of the current applied to the bridge is substantially reduced if not eliminated.

The signal of each bridge is transmitted through its output terminals to individual output circuits each of which includes a half wave rectifier which serves to permit the passage only of signals or current flow of a preselected direction or phase. The output circuits are connected in parallel and to a suitable amplifying means which amplifies the signal and feeds it to a central station having a single indicator that is actuated by the amplified signal.

Due to the construction and arrangement of the various elements of the instant system, the various detector stations thereof transmit signals only in response to variations in the condition being sensed in one direction from a critical value or point. Moreover, the various detector stations are isolated from each other to prevent interference therebetween or the algebraic addition of signals. In addition, by isolating each detector station, each may be adapted to respond to different ambient conditions.

Since presently-known rectifiers are not perfect in operation and, therefore, the output circuit rectifier might permit a signal of slight magnitude of opposite phase to pass through it, the input circuit rectifier is used to substantially cancel out the opposite or undesired phase of the current before it is fed to the input of the bridge. Further, the signalling system contemplated herein may be modified by the addition thereto of means for indicating when one or more of the detector elements burns out or becomes inoperative, thereby rendering the system ineffective to indicate ambient conditions at the detector stations.

The instant invention has general utility wherever it is desired to sense or detect ambient conditions at a plurality of outlying stations, and to transmit a signal from any one of the outlying stations to a central station upon the presence of a particular condition at the outlying station. However, the present invention has particular utility when used as a fire-detecting system. When so utilized, the resistance of the sensing or detecting element of each bridge is adapted to vary in response to temperature changes at the outlying station to the end that, upon an increase of temperature above a predetermined value at that station, a signal is transmitted to the central station to actuate an indicator. Due to the fact that each sensing or detecting element, and the bridge thereof, is isolated from the remaining ones, and hence the possibility of the algebraic addition of signals is eliminated, each may be adjusted to transmit a signal only in response to conditions or temperatures individual to that station. Thus, one detector may be adjusted to transmit a signal in response to a first temperature value, while each of the others may set to transmit signals at the same or different temperature values.

The above and other objects and advantages of the invention will become more apparent in the following description and accompanying drawings in which Fig. 1 is a circuit diagram of one embodiment of the invention for indicating a change in temperature at one or more of a plurality of outlying stations; and Fig. 2 is a circuit diagram of another embodiment of the invention.

Figure 1 illustrates one embodiment of the invention wherein temperature sensitive detectors are employed at a plurality of separated or isolated stations to detect critical or predetermined temperature rises or variations and transmit such intelligence to the central station, each detector being interconnected with each of the others to actuate a single indicating or recording means and without interference one with the others.

In Figure 1, the reference characters 10 to 15 inclusive designate six temperature responsive resistors or detectors, each having a positive co-efficient of resistance so that the resistance of the resistor varies as a function of ambient temperature to the end that as the temperature of a detector station varies, for example, increases, the resistance of the detector correspondingly varies or increases. Since each of these resistors vary in resistance with temperature, they have been indicated on the drawing as variable resistors. Although only six detectors have been illustrated, any number of such detectors may be used to actuate a single indicator as will become more apparent in the following description of the present invention. Detectors 10 etc. are each positioned in a location where it is desired to sense or detect the temperature at that point.

For the purpose of converting a change in resistance of detectors 10 etc. to a change in voltage for ultimate actuation of an indicating or recording means, each detector 10 etc. forms one leg of a Wheatstone bridge. As shown in Figure 1, bridges 16 to 21 inclusive are associated with detectors 10 to 15, respectively. More particularly, each bridge, 16 etc., includes three resistors 22, 23 and 24 connected in series one with the other and with the associated detector 10 etc., forming the fourth leg of the bridge and closing the circuit. Bridges 16 etc. are positioned in a convenient location which may be removed from detector 10 etc. The resistors 22, 23 and 24 are formed from a material having a very low co-efficient of resistivity such as manganin, to the end that they are not affected by ambient temperature conditions. The junction points between the several resistors forming the four legs of the bridge are designated by the letters $a$, $b$, $c$ and $d$. Thus, detector 10, for example, is connected to its associated bridge 16 by a lead 25 to terminal junction $c$ of the bridge and by a lead 26 and a test resistor 27 to terminal junction $b$. Resistor 27 is shunted by a normally closed switch 28 for the purpose of testing the equipment as will be hereinafter described. Except for resistor 27 and switch 28, each of the other bridges is similar to bridge 16 and the detectors thereof are connected by leads 25 and 26 to the junctions $c$ and $b$ of their respective bridges.

Bridges 16 etc. are energized by a rectified alternating current obtained by a transformer 29 having a primary winding 30 and a secondary winding 31. The primary winding 30 of the transformer is energized by an alternating current source "S." The secondary winding 31 is connected by leads 33, 33' and 34 to junction terminals $a$ of each bridge and by the lead 35, 35' and half wave rectifier 36 to the junction terminals $b$ thereof.

Referring now to bridge 16, alternating current from the transformer 29 is applied to the bridge terminals $a$ and $b$ through half wave rectifier 36 so that a unidirectional or interrupted direct current of a desired polarity is applied to the bridge to energize the same. Bridge 16 is constructed and arranged to the end that, in response to a predetermined ambient condition, for example, a particular temperature, the resistance of detector 10 is at a predetermined value that is equal to the individual resistance values of resistors 22, 23 and 24. Under these conditions bridge 16 is balanced and the voltage across the terminals $c$ and $d$ is at zero. Hence there is no current flow through the bridge nor is there a signal produced thereby. Upon an increase in the resistance of detector 10 above the predetermined value occasioned by an increase in the ambient temperature bridge 16 becomes unbalanced and a signal voltage is developed across terminals $c$ and $d$. Since terminal $b$ is negative and terminal $a$ positive, as shown, terminal $c$ becomes positive with respect to terminal $d$ under these conditions. Assuming that current flows from positive to negative, the current leaves bridge 16 (assuming a load is connected thereto) from terminal $c$ and returns through terminal $d$. For purposes of illustration, such flow may be designated positive current flow, and the signal produced thereby, a positive signal. On the other hand, if the resistance of detector 10 falls below the predetermined value in response to a decrease in the ambient temperature, terminal $c$ becomes negative with respect to terminal $d$. Under these conditions, current flow reverses in the bridge and a signal opposite in phase to first signal is produced. In short, the current flow may be termed negative and the signal, a negative signal. However, since rectifier 36 is included in the input circuit, the negative phase of the applied current is of substantially low value relative to the positive phase of the current. Thus, by providing rectifier 36 in the input circuit of each bridge, an interrupted direct current of a desired polarity is applied to the bridge.

The output or load circuits for bridges 16 etc. include terminals $c$ of each bridge which are connected through half wave rectifiers 37 with a lead 38, in the instance of bridges 16, 18, 20 etc. and with a lead 39 in the instance of bridges 17, 19, 21 etc. Leads 38 and 39 are connected by a wire 40 and a lead 41 connects lead 39 to the upper or ungrounded terminal of a resistor 42. The lower terminal of resistor 42 is connected through a lead 43 to ground and through ground and leads 44, which are connected by a wire 45, to the terminals $d$ of bridges 16, 18, 20 etc., and through a lead 46 and leads 47 which are connected together by a wire 48 to the terminals $d$ of bridges 17, 18, 21 etc.

Rectifiers 37 are unidirectional devices that pass current only in one direction. Thus, as shown in Figure 1, only a positive current or signal passes through the rectifiers 37 to resistor 42, while the negative current or signal is blocked by this rectifier. Due to the foregoing arrangement, by varying the resistance value of resistor 22, the critical point at which each bridge, and hence its respective detector, operates to transmit a positive signal, may be set at any desired value. Thus, the various detectors 10 etc., may be set to transmit a signal in response to different ambient conditions. For example, when used to detect the presence of critical ambient temperatures, one or more of the detectors may be adjusted to transmit a signal in response to an ambient temperature of say 500° F. or above, while the others may be adjusted to transmit a signal only in response to temperatures above 600° F. or any other selected temperature. It is understood, that if rectifiers 37 were to function perfectly and completely block negative signals, input circuit rectifiers 36 would not be needed. However, since presently-known rectifiers are not capable of perfect operation, rectifiers 36 in the input circuits serve to reduce the intensity of the negative phase of the current applied to the bridge to a point where rectifiers 37 prevent the passing of a negative signal developed thereby to resistor 42.

As previously set forth, a temperature rise at any one or more of the detector stations 10 etc. above the critical value of the sensing element, unbalances the associated Wheatstone bridges 16 etc. and results in a positive signal or positive flow or current through the load resistor 42, thereby developing a potential across it. This potential or signal is amplified by a voltage amplifier employing a twin triode electron tube 50 such as a type 6SN7, available on the market under this designation, although other types of tubes or any number thereof may be employed to obtain the desired degree of amplification.

In the illustrated embodiment, tube 50 includes a filament 51 that is heated by alternating current from a winding 52 of a transformer 53 connected with alternating current source "S" by the leads 54–55. The actual filament connections have been omitted for simplicity and the connections have been indicated by the letters $x$—$x$ and $x'$—$x'$ on filament 51 and winding 52. One cathode 56 of the tube is connected to ground by a cathode bias resistor 57 shunted by a suitable condenser 58. The grid 59 associated with cathode 56 is connected by a lead 60 to the upper side of the load resistor 42.

The plate circuit of the first section of the tube includes a plate 61, a plate resistor 62, a resistor-capacitor filter consisting of resistors 63 and 64 in series and condensers 65, 66 and 67 from the resistor terminals to ground. The right hand or input end of the filter is connected through a lead 68 to a rectifier 69. Rectifier 69, in turn, is connected through one half of tube winding 70 of transformer 53 and by means of a lead 71 from the center of the winding to ground. In this way rectified voltage from winding 70, filtered by the resistor-capacitor filter provides the plate or high voltage potential for the tube. With this arrangement, when a signal is received by resistor 42, the voltage developed across it is impressed on grid 59 of tube 50. This swings the grid positive and causes it to increase the current drawn through plate resistor 62 with the result that the voltage on plate 61 falls. Plate 61 of tube 50 is connected through a condenser 72 to a second grid 73 which in turn is connected to ground through a resistor 74. A cathode 75 is connected directly to ground and a plate 76 is connected through a plate resistor 77 to the junction between the filter resistors 63 and 64.

Tracing the amplified signal to the second section of the tube 50, it is found that the sudden fall of potential at plate 61 causes a corresponding fall of potential on second grid 73 which results in a decrease in plate current through plate resistor 77 connected with plate 76 with a resulting rise of potential at that plate. This potential rise is considerably larger than the original potential rise produced across resistor 42 when one or more of the detectors indicate the presence of a critical temperature. A condenser 79 is connected between ground and plate 76 by a lead 80 to correct inherent phase shifts in tube 50. The resultant signal is then fed to the next section of the indicating circuit by means of a condenser 81 connected between lead 80 and grid 83 of tube 82.

As hereinabove set forth, bridges 16 etc. are energized by a pulsating direct current produced by half wave rectification. Therefore, when a detector registers critical temperature, its resistance increases and unbalances the bridge in the desired direction to produce current flow through load resistor 42, the resultant potential is an intermittent one constantly rising and falling in synchronization with the frequency of the source. This signal is amplified by the type of voltage amplifier heretofore described and produces pulsing signal at grid 83 of tube 82.

Tube 82 is heated by a filament 84 connected to winding 52 of transformer 53 in the manner indicated by the letters $x$ and $x'$. Cathodes 85 and 86 are connected together and to ground through a common resistor 87. A grid 88 associated with cathode 86 is connected to ground through a resistor 89 and grid 83 is similarly connected to ground through resistor 90 preferably of the same value as resistor 89. The plate load for tube 82 is provided by a differential relay 91 having two series connected windings 92 and 93, a balanced armature 94 and contacts 95 and 96. Plates 98 and 99 are connected to the outer terminals by leads 100 and 101 while the center point of the windings are connected by a lead 102 to the right hand half of winding 70 of transformer 53. The connections between transformer 53 and plate 98 are such that the voltage applied to plate 98 is in phase with the signals developed across resistor 42. Each winding 92 and 93 is bridged by a condenser 103 and 104 to prevent chattering of the relay as the current supply is alternating current.

With the above circuit, and with no signal on grid 83, both plates of the tube draw equal current and armature 94 of the relay stays in the neutral or balanced condition as illustrated. When the signal produced by one or more of the detectors 10 etc. is impressed on grid 83, the associated plate 98 draws more current through its winding 93. Since plate 99 does not change, relay 91 is unbalanced and armature 94 engages contact 96. This completes a circuit from $x'$ (contact 96) armature 94, lamp 105 to $x$. With the terminals $x$—$x'$ being connected to $x$—$x'$ of winding 52, lamp 105 lights to indicate the existence of a critical temperature at one or more of stations 10 etc.

With the particular circuit embodying tube 82 and relay 91, any change in voltage of the alternating current produced by the source "S" will not unbalance the relay as both plates function uniformly as long as grid 83 is not energized by a signal from the voltage amplifier.

In order for the central station operator to test the operability of the indicating circuit a resistor 27 is connected in series with one of the detectors, detector 10 in this embodiment. A switch 28 connected across resistor 27 normally shortcircuits it and the value of the resistor is such that in series with the detector the resistance is slightly greater than that required to indicate a critical condition. The operator, upon opening switch 28, unbalances the associated bridge and, if the device is operating properly, lamp 105 is illuminated as previously described. Upon release of switch 28, lamp 105 is de-energized and extinguished.

In Figure 2 a somewhat modified circuit is illustrated which further simplifies certain circuit features of the system shown in Figure 1, and, in addition includes means to indicate when one or more of the detectors of the system becomes inoperative. Since the circuits of both forms of the invention are in the most part similar, like reference characters have been applied to like parts in each figure.

Thus, under certain conditions where it may be desirable to use a single rectifier for the several bridges 16 etc. to rectify the input current from the secondary 31 of transformer 29, the form of the present invention shown in Figure 2 accomplishes this end by eliminating the several rectifiers 36 and connecting the terminal $b$ of each bridge to its respective conductor 35' and inserting a single rectifier 36' in series with the lead 35 as illustrated and with the polarity as indicated. It is to be understood, however, that either an electron tube, metallic or other suitable rectifiers may be used for rectifier 36 or 36'. Similarly, an electron tube rectifier may also be used in place of the rectifier 69 in Figure 1. This substitution has been illustrated at 69' in Figure 2.

Except for the single half wave rectifier 36' in the input circuits, in lieu of rectifiers 36 individual to each bridge, the elements of the signalling systems shown in both Figures 1 and 2 for illuminating lamp 105 are the same and operate in the same manner. Thus, upon in increase in the resistance of any of the detector elements 10 etc. occasioned by an increase in the ambient temperatures above the predetermined value, the resulting positive signal developed by the associated bridge is transmitted through amplifier 50 to tube 82 and the latter is actuated to effect the illumination of lamp 105.

As above set forth, the modified form of the instant invention shown in Figure 2 also includes means for indicating when one or more of the detector stations becomes inoperative, for example, should one or more of the detectors 10 etc. or the leads 25 and 26 thereof burn out or become disconnected from its associated bridge. To this end, a thyratron tube 106 is associated with resistor 42 to receive signals therefrom simultaneously with tube 82.

Tube 106 is so adjusted that normal signals occasioned by an increase in the resistance of one or more detectors 10 etc. which signals are of sufficient magnitude to operate tube 82 and illuminate lamp 105, do not render tube 106 conductive. When, however, one or more of the detectors 10 etc. or the leads thereof burn out or becomes disconnected from its associated bridge, the resulting signal developed by this condition is relatively greater in magnitude or intensity than the normal signals. Therefore, tube 106 is adjusted to become conductive only in response to these greater or abnormal signals to provide for the illumination of a second lamp 107 associated therewith. Thus, when one or more detectors 10 etc. becomes inoperative, both lamps 105 and 107 are illuminated to indicate that the signalling system is no longer operative to sense ambient conditions at each of the detectors 10 etc.

More particularly, thyratron tube 106 has a control grid 108 connected by a lead 109 to lead 41 and the latter lead in turn is connected to the ungrounded side of resistor 42. Grid 108 is, therefore, directly responsive to the potential developed across resistor 42. A suppressor grid 110 of tube 106 is connected directly by a lead 111 to tube cathode 112 and through an adjustable resistor 113 to ground. Adjustable resistor 113 is connected as a variable rheostat and the cathode side thereof is connected through a resistor 114 and leads 115 and 116 to lead 102 which in turn is connected to winding 70 of transformer 53. By adjusting resistor 113, a desired potential is placed on cathode 112 which determines the intensity of amplitude of the signal on its grid to cause it to become conductive. The plate circuit of tube 106 includes a plate 117 connected through a lead 118 with the coil of a relay 119, connected in parallel with a condenser 120, and a lead 121 which connects to lead 116.

Relay 119 includes a pair of normally open contacts 122 and 123 which are connected in series with lamp 107 and to terminals x—x' of winding 52. Thus, when tube 106 becomes conductive in response to an abnormal signal, the resulting energization of relay 119 causes contacts 122 and 123 to close and lamp 107 is illuminated.

It is apparent from the foregoing description that the present invention embodies the advantages of simplicity, high degree of sensitivity and split-second response while at the same time it is extremely dependable and is insensitive to even severe vibration, voltage fluctuations in the source of power, and outside electrical interference.

Certain modifications to this invention, readily apparent to those skilled in the art, may be made, as for instance, the kind or number of electronic tubes, manner of indication of the danger signal, the response to ambient temperature condition, etc. without departing from the scope of the invention. Moreover, it is understood that the resistance of the sensing element may be varied in response to physical conditions other than temperature. For example, an acceleromter may be associated therewith to vary the resistance of the detecting or sensing element in response to accelerations, or the detecting element may be in the form of a strain gauge so as to indicate when a local area of an associated structure becomes overloaded.

It is also to be understood that, although indicating lamps are illustrative as the indicating means, audible signals may also be employed as well as means for providing a permanent or semi-permanent record of the actuation of the device provided by the critical conditions detected by the invention. Further, the signal may be utilized to operate any desired device associated therewith, for example, when the instant system is utilized as a fire detecting system, the signals may be used to operate suitable fire extinguishing equipment.

What is claimed is:

1. A signalling system comprising a plurality of detector stations each including a Wheatstone bridge having one leg formed by a resistor the resistance of which varies as a function of an ambient condition individual thereto, a source of alternating current, an input circuit connecting each Wheatstone bridge to said alternating current source and including a half-wave rectifier whereby a pulsating direct current is fed to each Wheatstone bridge, each detecting station being operative to develop positive and negative signals in response to changes in the resistance of its resistor occasioned by changes in the ambient condition individual thereto from a predetermined ambient condition, an output circuit for each detector station including a half wave rectifier, said output circuits being connected in parallel, and a central station indicating means connected to said output circuits and operable in response to signals received therefrom, said half wave rectifier in said output circuit being effective to transmit only positive signals to said indicating means and to isolate said detector stations one from the other.

2. A signalling system comprising a plurality of detector stations each including a Wheatstone bridge having one leg formed by a resistor the resistance of which varies as a function of an ambient condition individual thereto, a source of alternating current, an input circuit connecting each Wheatstone bridge to said alternating current source and including current rectifying means whereby a pulsating direct current is fed to each Wheatstone bridge, each detecting station being operative to develop positive and negative signals in response to changes in the resistance of its resistor occasioned by changes in the ambient condition individual thereto relative to a predetermined ambient condition, an output circuit for each detector station including current rectifying means, signal amplifying means, said output circuits being connected in parallel and to said signal amplifying means, and a central station indicating means connected to said amplifying means and operable in response to signals received therefrom, said current rectifying means in said output circuit being effective to transmit only positive signals to said amplifying means and to isolate said detector stations one from the other.

3. A signalling system comprising a plurality of detector stations each including a Wheatstone bridge having one leg thereof formed by a resistor the resistance of which varies as a function of the ambient temperature individual thereto, a source of alternating current, an input circuit individual to each Wheatstone bridge and connected to said alternating current source, means in each of said input circuits to provide a pulsating unidirectional current flow therethrough, each of said Wheatstone bridges being effective to develop a pulsating positive current flow therethrough upon an increase in the resistance of its associated resistor in response to an increase in the ambient temperature individual thereto and pulsating negative current flow therethrough upon a decrease in the resistance of its associated resistor in response to a decrease in the ambient temperature individual thereto, an output circuit individual to each Wheatstone bridge and connected in parallel with the other output circuits, means in each of said output circuits to provide pulsating unidirectional current flow therethrough whereby only pulsating positive current flows through each of said output circuits and whereby said Wheatstone bridges are isolated from each other, and a central station including indicating means connected to said output circuits and operated in response to the pulsating positive current flow therethrough.

4. A signalling system comprising a plurality of detector stations each including a Wheatstone bridge having one leg thereof formed by a resistor the resistance of which varies as a function of the ambient temperature individual thereto, a source of alternating current, an input circuit individual to each Wheatstone bridge and connected to said alternating current source, each of said input circuits including current rectifying means whereby a pulsating direct current is fed to each of said Wheatstone bridges rendering it effective to develop a pulsating positive current flow therethrough upon an increase in the resistance of its associated resistor in response to an increase in the ambient temperature individual thereto and a pulsating negative current flow therethrough upon a decrease in the resistance of its associated resistor in response to a decrease in the ambient temperature individual thereto, an output circuit individual to each Wheatstone bridge and connected in parallel, current rectifying means in each of said output circuits to provide unidirectional current flow therethrough whereby only pulsating positive current flows through each of said output circuits and whereby said Wheatstone bridges are isolated from each other, and a central station including indicating means connected to said output circuits and operated in response to pulsating positive current flow therethrough.

5. A signalling system comprising signal producing means including a detecting element operative in response to variations in an ambient condition relative to said detecting element to develop a first signal and in response to the rendering inoperative of said detecting element to develop a second signal, means connected to said signal producing means for transmitting said first and second signals, and a central station including first and second indicating means connected to said signal transmitting means to receive said first and second signals therefrom, said first indicating means being operable in response to both said first and second signals and said second indicating means being operable only in response to said second signal.

6. A signalling system comprising a plurality of detector stations each including a detector element and operative to develop first and second signals of opposite phase in response to opposite variations in an ambient condition individual to its detector element from a preselected ambient condition and a third signal of the same phase as said first signal but of greater magnitude when said detector element becomes inoperative, means connected to said detector stations for transmitting only said first and third signals, and a central station including first and second indicating means connected to said signal transmitting means to receive signals therefrom, said first indicating means being operable in response to both said first and third signals and said second indicating means being operable only in response to said third signal.

7. A signalling system comprising a plurality of detector stations each including a detector element and operative to develop first and second signals of opposite phase in response to opposite variations in an ambient condition individual to its detector element from a preselected ambient condition and a third signal of the same phase as said first signal but of greater magnitude when said detector element becomes inoperative, means connected to said detector stations for transmitting only said first and third signals and for isolating said detector stations one from the other to thereby prevent the algebraic addition of signals, and a central station including first and second indicating means connected to said signal transmitting means to receive signals therefrom, said first indicating means being operable in response to both said first and third signals and said second indicating means being operable only in response to said third signal.

8. In a fire detecting system the combination comprising a plurality of Wheatstone bridges each including a detecting resistor the resistance of which varies as a function of the ambient temperature, a source of alternating current, circuit means including half wave rectifying means connecting said source of alternating current to each of said Wheatstone bridges whereby a pulsating direct current is fed thereto, each of said Wheatstone bridges being constructed and arranged to be in balance when the ambient temperature at the detecting resistor thereof is at a preselected value and to become unbalanced upon an increase or decrease of the ambient temperature relative to the preselected value and thereby develop positive and negative signals respectively, an output circuit for each Wheatstone bridge for transmitting signals developed by its associated Wheatstone bridge, said output circuits being connected in parallel and including half wave rectifying means whereby only positive signals are transmitted therethrough; and a central station including indicating means connected to said output circuits and operative in response to positive signals received therefrom, said half wave rectifying means in said output circuits also isolating said Wheatstone bridges one from the other whereby the preselected value of the ambient temperature at each detecting resistor may be of the same or different value.

9. In a fire detecting system, the combination of a plurality of detecting stations each comprising a Wheatstone bridge including a detecting resistor the resistance of which varies as a function of the ambient temperature, a source of pulsating direct current connected to each of said Wheatstone bridges, each of said Wheatstone bridges being constructed and arranged to be in balance when the ambient temperature at the resistor thereof is at a preselected value and to become unbalanced upon an increase or decrease in the ambient temperature from the preselected value to thereby develop pulsating positive and negative signals, respectively, and an output circuit for each Wheatstone bridge for transmitting said signals, each of said output circuits being connected in parallel and including means for limiting the transmission of signals therethrough to positive signals only and for isolating said detecting stations one from the other whereby the preselected value of the ambient temperature at the resistor of each detecting station may be of the same or different value.

10. In an electrical system the combination comprising a plurality of current producing means operative in response to ambient conditions individual thereto to develop pulsating positive and negative currents, and an output circuit individual to each of said current producing means to receive said pulsating currents therefrom, each of said output circuits including means for limiting the current therethrough to either positive or negative current and to isolate the pulsating current producing means one from the other.

11. In combination, a plurality of signal developing means each operative in response to variations in an ambient condition individual thereto to develop pulsating signals of opposite phase, signal transmitting means connected to said signal developing means, and indicating means connected to said signal transmitting means and operable by signals received therefrom, said signal transmitting means including means in phase with one of said pulsating signals for transmitting only signals of one phase therethrough and for isolating each of said signal developing means one from the other.

12. In combination, a plurality of signal developing means each operative in response to variations in an ambient condition individual thereto to develop pulsating signals of opposite phase, signal transmitting means connected to said signal developing means and including means in phase with one of said pulsating signals to transmit only signals of that phase and to isolate said signal developing means one from the other, signal amplifying means connected to said signal transmitting means and operable to increase the signals received therefrom, and indicating means connected to said signal amplifying means and operable by signals received therefrom.

13. A signalling system comprising a signal producing means including a resistor operative to develop a first signal in response to variations in an ambient condition individual thereto and a second signal in response to an inoperative condition of the resistor, electrical means connected to said signal producing means for transmitting said first and second signals, and first and second electrically actuated indicating means connected to said signal transmitting means to receive said first and second signals therefrom, said first indicating means being operable in response to both said first and second signals and said second indicating means being operable in response to said second signal only.

14. A signalling system comprising a plurality of signal producing means each including a detecting element and operative to develop a first signal in response to variations in an ambient condition individual to its detecting element and a second signal in response to its detecting element becoming inoperative, means connected to each of said signal producing means for transmitting said first and second signals and for isolating each of said signal producing means from each other, and first and second indicating means connected to said signal transmitting means to receive said first and second signals therefrom, said first indicating means being operable in response to both said first and second signals and said second indicating means being operable only in response to said second signal.

15. A signalling system comprising a plurality of detector stations each including a Wheatstone bridge having one leg thereof formed by a resistor the resistance of which varies as a function of the ambient temperature individual thereto, an input circuit including a source of alternating current and current rectifying means connected to each Wheatstone bridge whereby a pulsating direct current is fed thereto and whereby it develops a first signal upon an increase in the resistance of its associated resistor in response to an increase in the ambient temperature individual thereto and a second signal upon the rendering inoperative of its associated resistor, electrical circuit means including amplifying means connected to said detector stations for transmitting and amplifying said first and second signals, and first and second indicating means connected to said signal transmitting circuit to receive said first and second signals, said first indicating means being operable in response to both said first and second amplified signals and said second indicating means being operable only in response to said second amplified signal.

16. A signalling system comprising a plurality of detector stations each including a Wheatstone bridge having one leg thereof formed by a resistor the resistance of which varies as a function of the ambient temperature individual thereto, an input circuit including a source of pulsating direct current connected to each Wheatstone bridge whereby each Wheatstone bridge develops a first signal upon an increase in the resistance of its associated resistor in response to an increase in the ambient temperature individual thereto and a second signal upon the rendering inoperative of its associated resistor, output circuit means connected to said detector stations for transmitting said first and second signals, said output circuit means including means to isolate said detector stations one from the other and to amplify said first and second signals, and first and second indicating means connected to said output circuit to receive said amplified first and second signals, said first indicating means being operable in response to both said first and second signals and said second indicating means being operable only in response to said second signal.

17. A signalling system comprising a plurality of detector stations each including a Wheatstone bridge having one leg thereof formed by a resistor the resistance of which varies as a function of the ambient temperature individual thereto, an input circuit including a source of pulsating direct current connected to each Wheatstone bridge whereby each Wheatstone bridge develops a first signal upon an increase in the resistance of its associated resistor in response to an increase in the ambient temperature individual thereto and a second signal upon the rendering inoperative of its associated resistor, output circuit means including means for isolating said detector stations one from the other connected to said detector stations for transmitting said first and second signals, and first and second indicating means connected to said output circuit to receive said first and second signals, said first indicating means being operable in response to both said first and second signals and said second indicating means being operable only in response to said second signal.

18. A signalling system comprising a plurality of detector stations each including a Wheatstone bridge having one leg thereof formed by a resistor the resistance of which varies in response to variations in an ambient condition individual thereto from a preselected ambient condition, an input circuit for said Wheatstone bridges including a source of alternating current and current rectifying means whereby a pulsating direct current is fed to each Wheatstone bridge and whereby each of said Wheatstone bridges becomes effective to develop first and second signals of opposite phase in response to opposite variations in an ambient condition individual to its associated resistor from a preselected ambient condition and a third signal of the same phase as said first signal but of greater magnitude when said resistor becomes inoperative, output circuit means connected to said detector stations and including means for transmitting only said first and third signals therethrough and to isolate said detector stations one from the other, and first and second indicating means connected to said output circuit means to receive signals therefrom, said first indicating means being operable in response to both said first and third signals and said second indicating means being operable only in response to said third signal.

References Cited in the file of this patent

UNITED STATES PATENTS

| | | |
|---|---|---|
| 2,037,565 | Dozler | Apr. 14, 1936 |
| 2,123,220 | Weld | July 12, 1938 |
| 2,355,934 | Weld | Aug. 15, 1944 |
| 2,456,499 | Fritzinger | Dec. 14, 1948 |
| 2,547,011 | Jacobsen | Apr. 3, 1951 |
| 2,556,363 | Lord et al. | June 12, 1951 |
| 2,667,630 | Jorgensen | Jan. 26, 1954 |

FOREIGN PATENTS

| | | |
|---|---|---|
| 534,300 | Great Britain | Mar. 4, 1941 |
| 647,724 | Germany | July 10, 1937 |